United States Patent
Park et al.

(10) Patent No.: US 9,519,083 B2
(45) Date of Patent: Dec. 13, 2016

(54) DISPLAY WINDOW FOR DISPLAY APPARATUS AND DISPLAY APPARATUS INCLUDING THE SAME

(71) Applicant: SAMSUNG DISPLAY CO., LTD., Yongin, Gyeonggi-Do (KR)

(72) Inventors: Sang-Il Park, Yongin (KR); Hyun-Joon Oh, Yongin (KR); Hye-Jin Oh, Yongin (KR); Jeoung-Sub Lee, Yongin (KR); Min-Hoon Choi, Yongin (KR); In-Sun Hwang, Yongin (KR)

(73) Assignee: SAMSUNG DISPLAY CO., LTD., Yongin, Gyunggi-Do (KR)

( * ) Notice: Subject to any disclaimer, the term of this patent is extended or adjusted under 35 U.S.C. 154(b) by 1 day.

(21) Appl. No.: 14/528,377

(22) Filed: Oct. 30, 2014

(65) Prior Publication Data

US 2015/0355384 A1 Dec. 10, 2015

(30) Foreign Application Priority Data

Jun. 9, 2014 (KR) .................. 10-2014-0069568

(51) Int. Cl.
*G02B 1/14* (2015.01)
*G06F 3/041* (2006.01)

(52) U.S. Cl.
CPC ............ *G02B 1/14* (2015.01); *G06F 3/0412* (2013.01); *G06F 2203/04102* (2013.01); *Y10T 428/24802* (2015.01); *Y10T 428/24851* (2015.01)

(58) Field of Classification Search
None
See application file for complete search history.

(56) References Cited

U.S. PATENT DOCUMENTS

| 5,988,503 A * | 11/1999 | Kuo ................ G06K 19/06046 |
| | | 235/457 |
| 2005/0053768 A1* | 3/2005 | Friedman .................. B32B 3/30 |
| | | 428/167 |
| 2011/0032704 A1* | 2/2011 | Oh .......................... G09G 3/14 |
| | | 362/249.14 |
| 2013/0034685 A1 | 2/2013 | An et al. |
| 2013/0208196 A1* | 8/2013 | Kim .................. G02F 1/134309 |
| | | 349/15 |

FOREIGN PATENT DOCUMENTS

| JP | 2002-094203 A | 3/2002 |
| JP | 2013-045823 A | 3/2013 |
| KR | 10-2011-0062523 A | 6/2011 |
| KR | 10-2013-0103158 A | 9/2013 |

* cited by examiner

*Primary Examiner* — Laura Powers
(74) *Attorney, Agent, or Firm* — Lee & Morse P.C.

(57) ABSTRACT

Provided is a display window for a display apparatus, the display window including a base plate; a plurality of first coating patterns on an entire first surface of the base plate spaced from one another; and a plurality of second coating patterns on an entire second surface of the base plate spaced from one another and corresponding to the first coating patterns. A width of each of the first coating patterns is less than a width of a corresponding second coating pattern.

18 Claims, 3 Drawing Sheets

DISPLAY WINDOW FOR DISPLAY APPARATUS AND DISPLAY APPARATUS INCLUDING THE SAME

CROSS-REFERENCE TO RELATED APPLICATION

Korean Patent Application No. 10-2014-0069568, filed on Jun. 9, 2014, in the Korean Intellectual Property Office, and entitled: "Display Window for Display Apparatus and Display Apparatus Including the Same," is incorporated by reference herein in its entirety.

BACKGROUND

1. Field

One or more embodiments relate to a display window for a display apparatus and a display apparatus including the same, for example, a display window for a display apparatus, which may be capable of maintaining flexible characteristics and may have high durability, and a display apparatus including the display window.

2. Description of the Related Art

To manufacture a flexible display apparatus, a flexible substrate formed of, for example, resin may be used rather than a glass substrate, and a display window may be disposed on a front surface of a display panel to protect the display panel.

SUMMARY

Embodiments may be realized by providing a display window for a display apparatus, the display window including a base plate; a plurality of first coating patterns on an entire first surface of the base plate spaced from one another; and a plurality of second coating patterns on an entire second surface of the base plate spaced from one another and corresponding to the plurality of first coating patterns. A width of each of the first coating patterns is less than a width of a corresponding second coating pattern.

Each of the first coating patterns may overlap the corresponding second coating pattern.

Edges of each of the first coating patterns may be located within an outer periphery of the corresponding second coating pattern.

The first coating patterns and the second coating patterns may be in a one-to-one correspondence.

The first coating patterns and the second coating patterns may be in an n-to-one correspondence, n denoting a natural number that is equal to or greater than 2.

The first coating patterns and the second coating patterns may be in an n-to-one correspondence in a central portion of the base plate, and may be in a k-to-one correspondence in a peripheral portion of the base plate, n and k each denoting a natural number and n>k.

The base plate may have a rectangular shape including a long axis and a short axis, and the second coating patterns may extend along the short axis and may be arranged along the long axis.

The first coating patterns and the second coating patterns may be in an n-to-one correspondence in a central portion of the base plate, and may be in a k-to-one correspondence in a peripheral portion of the base plate, with respect to the long axis of the base plate, n and k each denoting a natural number and n>k.

The second surface of the base plate may be a surface facing a display panel.

A hardness of the first coating patterns and a hardness of the second coating patterns may each be greater than a hardness of the base plate.

Embodiments may be realized by providing a display apparatus, including a display panel including display devices; and a display window on the display panel, the display window including a base plate; a plurality of first coating patterns on an entire first surface of the base plate spaced from one another; and a plurality of second coating patterns on an entire second surface of the base plate spaced from one another and corresponding to the plurality of first coating patterns. A width of each of the first coating patterns is less than a width of a corresponding second coating pattern, and the second surface of the base plate faces the display panel.

The display apparatus may further include a touch panel between the display panel and the display window.

Each of the first coating patterns may overlap the corresponding second coating pattern.

Edges of each of the first coating patterns may be located within an outer periphery of the corresponding second coating pattern.

The first coating patterns and the second coating patterns may be in a one-to-one correspondence.

The first coating patterns and the second coating patterns may be in an n-to-one correspondence, n denoting a natural number that is equal to or greater than 2.

The first coating patterns and the second coating patterns may be in an n-to-one correspondence in a central portion of the base plate, and the first coating patterns and the second coating patterns may be in a k-to-one correspondence in a peripheral portion of the base plate, n and k each denoting a natural number and n>k.

The base plate may have a rectangular shape including a long axis and a short axis, and the second coating patterns may extend along the short axis and may be arranged along the long axis.

The first coating patterns and the second coating patterns may be in an n-to-one correspondence in a central portion of the base plate, and the first coating patterns and the second coating patterns may be in a k-to-one correspondence in a peripheral portion of the base plate, with respect to the long axis of the base plate, n and k each denoting a natural number and n>k.

A hardness of the first coating patterns and a hardness of the second coating patterns may each be greater than a hardness of the base plate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
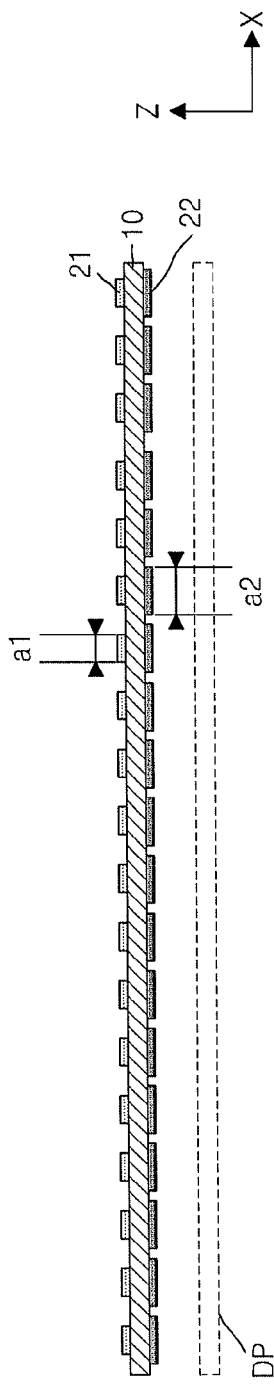
FIG. 1 illustrates a schematic cross-sectional view of a display window for a display apparatus and/or a display apparatus including the same according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the accompanying drawings, like elements are denoted by like reference numerals and are not redundantly described.

It will be understood that when a layer, region, or component is referred to as being "formed on," another layer, region, or component, it can be directly or indirectly formed on the other layer, region, or component. That is, for example, intervening layers, regions, or components may be present. Sizes of elements in the drawings may be exaggerated for convenience of explanation. In other words, since sizes and thicknesses of components in the drawings are arbitrarily illustrated for convenience of explanation, the following embodiments are not limited thereto. As used herein, the term "and/or" includes any and all combinations of one or more of the associated listed items.

In the following examples, the x-axis, the y-axis, and the z-axis are not limited to three axes of a rectangular coordinate system, and may be interpreted in a broader sense. For example, the x-axis, the y-axis, and the z-axis may be perpendicular to one another or may represent different directions that are not perpendicular to one another.

FIG. 1 illustrates a schematic cross-sectional view of a display window for a display apparatus and/or a display apparatus including the same according to an embodiment. Referring to FIG. 1, the display window for a display apparatus according to an embodiment may include a base plate 10, first coating patterns 21, and second coating patterns 22.

The base plate 10 may form a whole exterior of the display window for a display apparatus. The base plate 10 may be formed of, e.g., an olefin-based elastomer, a urethane-based elastomer and/or a polyester-based elastomer, and the display window for a display apparatus may have flexible characteristics. The base plate 10 may be formed to a thickness of, for example, 500 μm or less.

The first coating patterns 21 may be disposed to be spaced from one another on an entire first surface of the base plate 10. The second coating patterns 22 may be disposed to be spaced from one another on an entire second surface of the base plate 10 opposite the first surface of the base plate 10.

Hardness of a material of the first coating patterns 21 or a material of the second coating patterns 22 may be greater than that of a material of the base plate 10. For example, the first coating patterns 21 or the second coating patterns 22 may include, for example, borides, carbides, or nitrides of aluminum, silicon, or boron; diamond; oxides of aluminum, zirconium, titanium, or beryllium; or polysilazane.

In the display window for a display apparatus according to an embodiment, the base plate 10 may have flexible characteristics and may be disposed on a front surface of a flexible display panel DP.

The display window for a display apparatus may include the base plate 10 and the first coating patterns 21 and the second coating patterns 22 on the first and second surfaces of the base plate 10, and the durability of the display window for a display apparatus may greatly increase. The hardness of the first coating patterns 21 and the hardness of the second coating patterns 22 may each be higher than the hardness of the base plate 10, and the durability of the display window for a display apparatus may increase. For example, an external shock may be applied to the display window for a display apparatus, the hardness of the first coating patterns 21 and the harness of the second coating patterns 22 may be high, and the whole display window for a display apparatus may be effectively prevented from being damaged or scratched.

The base plate 10 may be coated with a material having high hardness, and the flexible characteristics of the display window for a display apparatus may be degraded. According to the display window for a display apparatus according to an embodiment, the first coating patterns 21 may be patterned to be spaced from one another and the second coating patterns 22 may also patterned to be spaced from one another. The first coating patterns 21 and the second coating patterns 22 may have high hardness, and the difference between the flexible characteristics of the display window for a display apparatus and the flexible characteristics of the base plate 10 may not be large.

The display window for a display apparatus may be mounted on the display panel DP, and the second surface of the base plate 10, i.e., the second coating patterns 22 formed on the second surface of the base plate 10, may be disposed to face the display panel DP as illustrated in FIG. 1.

A width a1 of each of the first coating patterns 21 may be set to be less than a width a2 of a corresponding coating pattern 22 among the second coating patterns 22, hardness of the display window for a display apparatus may be increased, and the flexible characteristics thereof may be maintained.

Referring to FIG. 1, the display window for a display apparatus may be bent in a state in which the window may be mounted on the display panel DP such that both ends thereof (ends in an +x direction and an −x direction) are moved in a +z direction and a central portion thereof is moved in a −z direction, and the radius of the curvature of the first surface of the base plate 10 is shorter than the radius of the curvature of the second surface thereof. The base plate 10 may be bent as described above, and degradation in the flexible characteristics may be prevented, for example, by setting the width a1 of each of the first coating patterns 21 disposed on the first surface of the base plate 10 to be less than the width a2 of the corresponding second coating pattern 22 among the second coating patterns 22.

The display window for a display apparatus may be bent in an opposite direction such that both ends thereof (the ends in the +x direction and the −x direction) are moved in the −z direction and the central portion thereof is moved in the +z direction, and the radius of the curvature of the second surface of the base plate 10 may be shorter than the radius of the curvature of the first surface of the base plate 10. In an embodiment, the display window may be bent as described above, and the flexible characteristics of the display apparatus may be determined by, for example, the display panel DP rather than the window for a display apparatus. The durability of the display window for a display apparatus may be increased by appropriately increasing the widths a2 of the second coating patterns 22 on the second surface of the base plate 10 rather than by reducing the widths a2 of the second coating patterns 22.

As described above, both the flexible characteristics of and the durability of the display window for a display apparatus may be increased by setting the width a1 of each of the first coating patterns 21 on the first surface of the base plate 10 to be less than that width a2 of the corresponding second coating pattern 22 among the second coating patterns 22.

In an embodiment, the first coating patterns 21 may be formed on the first surface of the base plate 10 without forming the second coating patterns 22 on the second surface of the base plate 10. The base plate 10 may be formed of a material having lower hardness than the hardness of the material of the first coating patterns 21, and the base plate 10 may have the flexible characteristics as described above. The display window for a display apparatus may include the first coating patterns 21 and may not include the second coating patterns 22, and the base plate 10 may be damaged by an external shock.

The base plate 10 having low hardness may be supported on both sides by the first coating patterns 21 and the second coating patterns 22 having high hardness, for example, by forming the first coating patterns 21 on the first surface of the base plate 10 and the second coating patterns 22 on the second surface of the base plate 10. The flexible characteristics of the display window for a display apparatus may be maintained, and the hardness of the whole display window for a display apparatus may be increased.

Each of the first coating patterns 21 may overlap the corresponding second coating pattern 22 among the second coating patterns 22 as illustrated in FIG. 1, and each local point on the base plate 10 having low hardness may be supported on both sides by both the first coating patterns 21 and the second coating patterns 22 having high hardness. The flexible characteristics of the display window for a display apparatus may be maintained, and the hardness of the whole window may be greatly increased.

Figure 2:
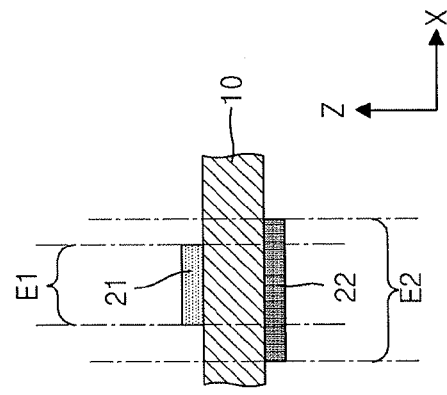
FIG. 2 illustrates an enlarged cross-sectional view of a portion of the display window for a display apparatus of FIG. 1.

Referring to FIG. 2, which illustrates a schematic enlarged cross-sectional view of a portion of the display window for a display apparatus of FIG. 1, an edge E1 of each of the first coating patterns 21 may be within the corresponding second coating pattern 22 among the second coating patterns 22 when viewed in a direction (z-axis direction) perpendicular to the base plate 10 disposed on an x-y plane, e.g., edges of each of the plurality of first coating patterns may be located within an outer periphery of the corresponding second coating pattern.

Figure 3:
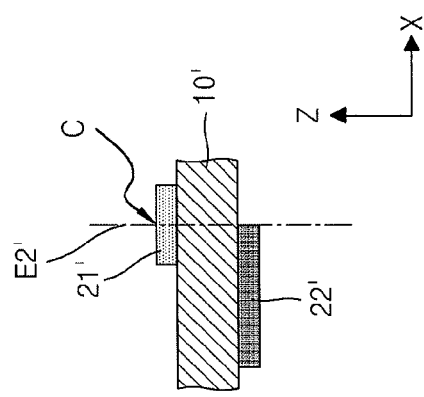
FIG. 3 illustrates an enlarged cross-sectional view of a portion of a display window for a display apparatus according to a comparative example.

As illustrated in FIG. 3, which illustrates an enlarged cross-sectional view of a portion of a window for a display apparatus according to a comparative example, if an edge of each of a plurality of first coating patterns 21' is beyond an edge E2' of a corresponding second coating pattern 22' among a plurality of second coating patterns 22' when viewed in a direction (z-axis direction) perpendicular to a base plate 10' disposed on an x-y plane, damage, e.g., cracks, may be caused in the plurality of first coating patterns 21'.

During use of a display apparatus by a user, a display window that may be an outermost part of the display apparatus may be touched by the user's hand or an external shock may be applied to the display window. For example, the display apparatus may have a touch screen function, the display window may be frequently touched by the user, and pressure may be applied to the window in a −z direction.

The first coating pattern 21' may extend beyond the edge E2' of the second coating pattern 22' as illustrated in FIG. 3, pressure may be repeatedly applied to the base plate 10' in the −z direction perpendicular to the base plate 10', and stress may be applied to a portion C of the first coating pattern 21' corresponding to the edge E2' of the second coating pattern 22'. A portion of the base plate 10' on which the second coating pattern 22' is present may be supported by the second coating pattern 22', a display panel (not shown) below, for example, the second coating pattern 22', and a portion of the base plate 10' on which the second coating pattern 22' is not present may not be directly supported by the display panel below, for example, the second coating pattern 22'. This stress may repeatedly be applied to the first coating pattern 21' and, for example, cracks may occur near the portion C of the first coating pattern 21' corresponding to the edge E2' of the second coating pattern 22'.

In an embodiment, as illustrated in FIG. 2, the edge E1 of each of the first coating patterns 21 may be within the corresponding second coating pattern 22 among the second coating patterns 22 when viewed from the direction (z-axis direction) perpendicular to the base plate 10 on the x-y plane, cracks may be effectively prevented from occurring in the first coating patterns 21, and the durability of the display window for a display apparatus may greatly increase.

Figure 4:
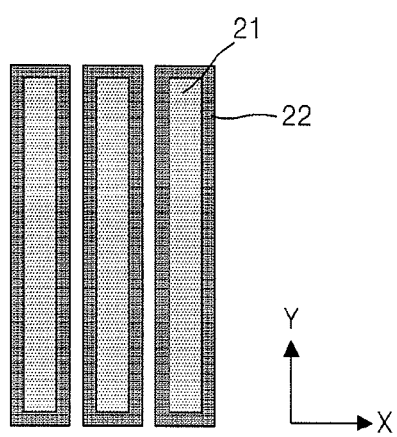
FIG. 4 illustrates a conceptual schematic diagram of first coating patterns and second coating patterns included in a display window for a display apparatus according to an embodiment.

The first coating patterns 21 and the second coating patterns 22 may have various patterns. The base plate 10 may have a rectangular shape including a long axis (e.g., an x-axis) and a short axis (e.g., a y-axis), and the first coating patterns 21 and the second coating patterns 22 may each have, for example, a shape extending along the short axis (the y-axis) of the base plate 10 as illustrated in FIG. 4. The first coating patterns 21 and the second coating patterns 22 may be arranged along the long axis (the x-axis) of the base plate 10. In an embodiment, the first coating patterns 21 and the second coating patterns 22 may each have a shape similar to a square as illustrated in FIG. 5.

Figure 5:
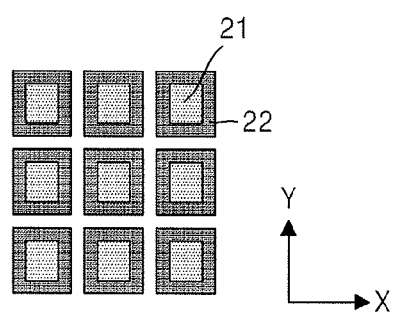
FIG. 5 illustrates a conceptual schematic diagram of first coating patterns and second coating patterns included in a display window for a display apparatus according to an embodiment.
Figure 6:
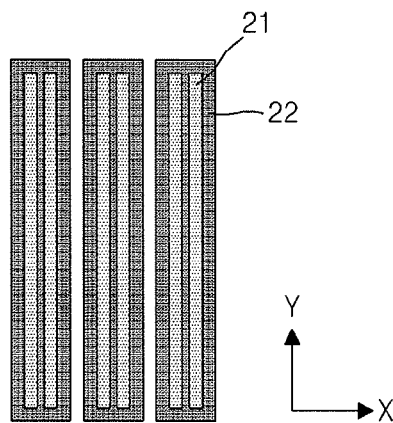
FIG. 6 illustrates a conceptual schematic diagram of first coating patterns and second coating patterns included in a display window for a display apparatus according to an embodiment.
Figure 7:
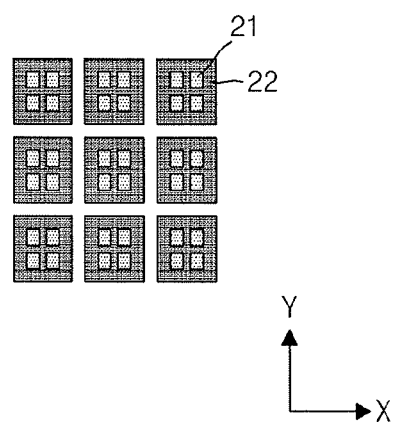
FIG. 7 illustrates a conceptual schematic diagram of first coating patterns and second coating patterns included in a display window for a display apparatus according to an embodiment.

FIGS. 4 and 5 illustrate, for example, that there may be a one-to-one correspondence between the first coating patterns 21 and the second coating patterns 22. In an embodiment, as illustrated in FIG. 6, first coating patterns 21 and second coating patterns 22 may each have a shape extending along a short axis (a y-axis) of a base plate 10 and two first coating patterns 21 may correspond to one second coating pattern 22. In an embodiment, as illustrated in FIG. 7, first coating patterns 21 and second coating patterns 22 may each have a shape similar to a square and four first coating patterns 21 may correspond to one second coating pattern 22. There may be an n-to-one correspondence between the first coating patterns 21 and the second coating patterns 22, where 'n' is a natural number that is equal to or greater than '2'.

Figure 8:
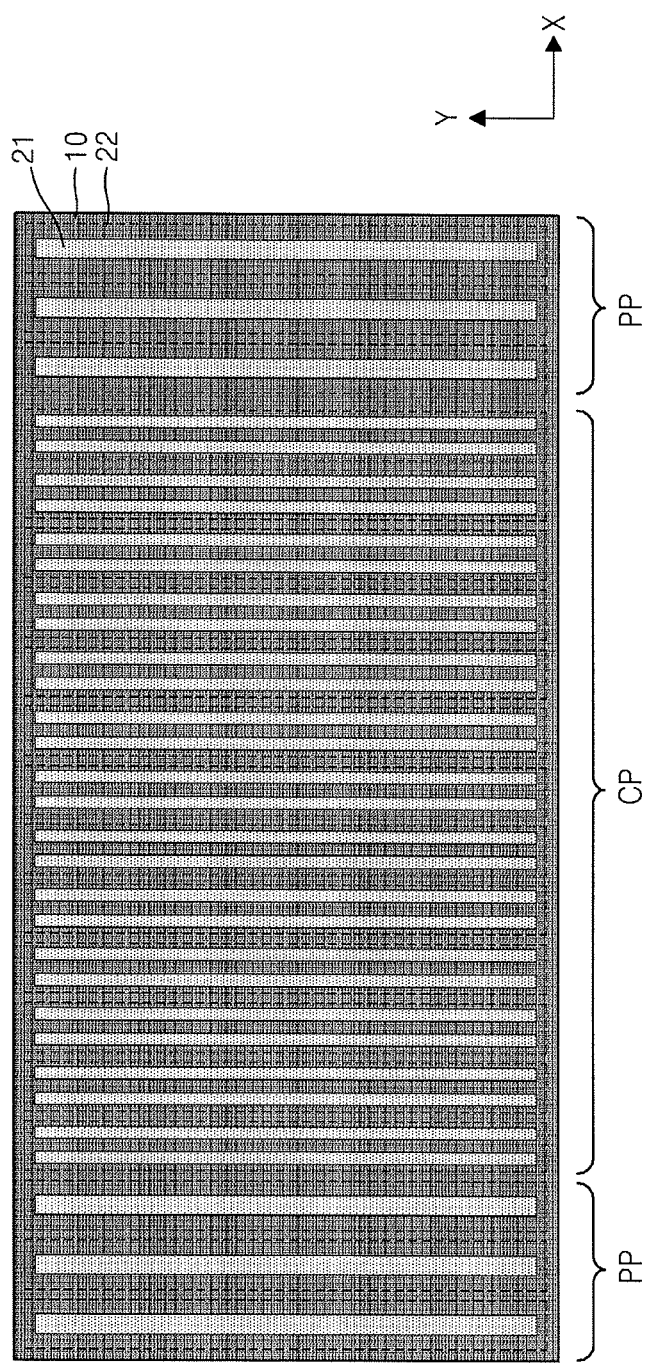
FIG. 8 illustrates a schematic plan view of a display window for a display apparatus according to an embodiment.

FIG. 8 illustrates a schematic plan view of a display window for a display apparatus according to an embodiment. In the display window for a display apparatus according to an embodiment, a base plate 10 may have a rectangular shape including a long axis (e.g., an x-axis) and a short axis (e.g., a y-axis). First coating patterns 21 and second coating patterns 22 may each have a shape extending along the short axis (the y-axis) of the base plate 10. The first coating patterns 21 and the second coating patterns 22 may be arranged along the long axis (the x-axis) of the base plate 10.

Two first coating patterns 21 may correspond, for example, to one second coating pattern 22 in a central portion CP of the base plate 10, and one first coating pattern 21 may correspond, for example, to one second coating pattern 22 in a peripheral portion PP of the base plate 10. A number 'n' of first coating patterns 21 may correspond to one second coating pattern 22 in the central portion CP of the base plate 10, and a number 'k' of first coating patterns 21 may correspond to one second coating pattern 22 in the peripheral portion PP of the base plate 10, where 'n' and 'k' each denotes a natural number and n>k.

A central portion of a display apparatus may be more frequently touched by a user than a peripheral portion of the display apparatus. For example, for a display apparatus having a touch screen function, a central portion of a displayed screen may be more frequently touched by a user than a peripheral portion of the screen. The central portion CP of the base plate 10 may be more frequently touched by a user than the peripheral portion PP of the base plate 10, and higher pressure may be applied to the central portion CP than to the peripheral portion PP.

The areas of the first coating patterns 21 may be the same, the central portion CP of the base plate 10 may be covered with more first coating patterns 21 than the peripheral portion PP of the base plate 10 by setting 'n' first coating patterns 21 to correspond to one second coating pattern 22 in the central portion CP of the base plate 10 and 'k' first coating patterns 21 to correspond to one second coating pattern 22 in the peripheral portion PP of the base plate 10, where 'n' and 'k' are each a natural number and n>k, and the durability of the display window for a display apparatus may greatly increase.

As illustrated in FIG. 8, 'n' first coating patterns 21 may correspond to one second coating patterns 22 in the central portion CP of the base plate 10, 'k' first coating patterns 21 may correspond to one second coating pattern 22 in the peripheral portion PP of the base plate 10, the area of each of the first coating patterns 21 in the peripheral portion PP may be greater than in the central portion CP, and the durability of the display window in the peripheral portion PP may increase.

The durability of the whole display window may be increased by increasing the area of each of the first coating patterns 21 in the central portion CP. In an embodiment, a central portion CP of a flexible display apparatus may be mainly bent and a peripheral portion PP thereof may be hardly bent, the durability of the display window for a display apparatus may be greatly increased, and the flexible characteristics of the window for a display apparatus or a display apparatus including the same may be maintained, for example, by setting 'n' first coating patterns 21 to correspond to one second coating pattern 22 in the central portion CP and 'k' first coating patterns 21 to correspond to one second coating pattern 22 in the peripheral portion PP.

FIG. 8 illustrates, for example, that the base plate 10 may have a rectangular shape including a long axis (an x-axis) and a short axis (a y-axis), and the first coating patterns 21 and the second coating patterns 22 may each have a shape extending along the short axis (the y-axis) of the base plate 10 and may be arranged along the long axis (the x-axis) of the base plate 10. For example, as described above, the first coating patterns 21 and the second coating patterns 22 may each have a shape similar to a square as illustrated in FIG. 5 or 7.

A number 'n' of first coating patterns 21 may correspond to one second coating pattern 22 in a central portion of the base plate 10 and a number 'k' of first coating patterns 21 may correspond to one second coating pattern 22 in a peripheral portion of the base plate 10, where 'n' and 'k' each denote a natural number and n>k. The peripheral portion of the base plate 10 may have a shape surrounding the central portion of the base plate 10, unlike the peripheral portion PP of FIG. 8.

Display windows for a display apparatus according to the one or more embodiments have been described above. For example, a display panel including display devices, and a display apparatus disposed on the display panel and including a display window for a display apparatus according to an embodiment or modified examples thereof are also provided. A second surface of a base plate of a display window, i.e., a surface of the base plate on which a plurality of second coating patterns may be arranged, may be disposed to face the display panel. Also, a touch panel may be disposed between the display panel and the display window for a display apparatus. Provided are embodiments in various forms.

By way of summation and review, for a flexible display apparatus, a display window may bend as the flexible display apparatus is bent, and a display window having flexible characteristics may be used. However, the display window having flexible characteristics may have low durability, and may be easily damaged or scratched by an external shock. As described above, according to exemplary embodiments, a display window for a display apparatus which may maintain flexible characteristics thereof and which may have high durability and a display apparatus including the same may be provided.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A display window for a display apparatus, the display window comprising:
  a flexible base plate;
  a plurality of first coating patterns on an entire first surface of the flexible base plate, the first coating patterns being spaced from one another in a first direction; and
  a plurality of second coating patterns on an entire second surface of the flexible base plate, the second coating patterns being spaced from one another in the first direction, at least one of each of the first coating patterns is located within an outer periphery of a corresponding single one of the second coating patterns in the first direction, such that the entirety of each of the first coating patterns is located within an outer periphery of a corresponding single one of the second coating patterns in the first direction.
2. The display window as claimed in claim 1, wherein the entirety of a single first coating pattern is located within the outer periphery of corresponding single one of the second coating patterns in the first direction.

3. The display window as claimed in claim 1, wherein the entirety of more than one first coating patterns is located within the outer periphery of corresponding single one of the second coating patterns in the first direction.

4. The display window as claimed in claim 1, wherein the entirety of n first coating patterns is located within the outer periphery of corresponding single one of the second coating patterns in the first direction in a central portion of the base plate, and the entirety of k first coating patterns is located within the outer periphery of corresponding single one of the second coating patterns in the first direction in a peripheral portion of the base plate, n and k each denoting a natural number and n>k.

5. The display window as claimed in claim 1, wherein the base plate has a rectangular shape including a long axis extending in the first direction and a short axis extending in a second direction, the second direction being orthogonal to the first direction, and the second coating patterns extend along the short axis.

6. The display window as claimed in claim 5, wherein the entirety of n first coating patterns is located within the outer periphery of corresponding single one of the second coating patterns in the first direction in a central portion of the base plate, and the entirety of k first coating patterns is located within the outer periphery of corresponding single one of the second coating patterns in the first direction in a peripheral portion of the base plate, with respect to the long axis of the base plate, n and k each denoting a natural number and n>k.

7. The display window as claimed in claim 1, wherein the second surface of the base plate is a surface facing a display panel.

8. The display window as claimed in claim 1, wherein a hardness of the first coating patterns and a hardness of the second coating patterns are each greater than a hardness of the base plate.

9. A display apparatus, comprising:
a display panel including display devices; and
a display window on the display panel, the display window including:
  a flexible base plate;
  a plurality of first coating patterns on an entire first surface of the flexible base plate, the first coating patterns being spaced from one another in a first direction; and
  a plurality of second coating patterns on an entire second surface of the flexible base plate, the second coating patterns being spaced from one another in the first direction,
at least one of each of the first coating patterns is located within an outer periphery of a corresponding single one of the second coating patterns in the first direction such that the entirety of each of the first coating patterns is located within an outer periphery of a corresponding single one of the second coating patterns in the first direction, and the second surface of the flexible base plate facing the display panel.

10. The display apparatus as claimed in claim 9, further comprising a touch panel between the display panel and the display window.

11. The display apparatus as claimed in claim 9, wherein the entirety of a single first coating pattern is located within the outer periphery of corresponding single one of the second coating patterns in the first direction.

12. The display apparatus as claimed in claim 9, wherein the entirety of more than one first coating patterns is located within the outer periphery of corresponding single one of the second coating patterns in the first direction.

13. The display apparatus as claimed in claim 9, wherein the entirety of n first coating patterns is located within the outer periphery of corresponding single one of the second coating patterns in the first direction in a central portion of the base plate, and the entirety of k first coating patterns is located within the outer periphery of corresponding single one of the second coating patterns in the first direction in a peripheral portion of the base plate, n and k each denoting a natural number and n>k.

14. The display apparatus as claimed in claim 9, wherein the base plate has a rectangular shape including a long axis extending in the first direction and a short axis extending in a second direction, the second direction being orthogonal to the first direction, and the second coating patterns extend along the short axis.

15. The display apparatus as claimed in claim 14, wherein the entirety of n first coating patterns is located within the outer periphery of corresponding single one of the second coating patterns in the first direction in a central portion of the base plate, and the entirety of k first coating patterns is located within the outer periphery of corresponding single one of the second coating patterns in the first direction in a peripheral portion of the base plate, with respect to the long axis of the base plate, n and k each denoting a natural number and n>k.

16. The display apparatus as claimed in claim 9, wherein a hardness of the first coating patterns and a hardness of the second coating patterns are each greater than a hardness of the base plate.

17. The display apparatus as claimed in claim 9, wherein: the first coating patterns extend in a second direction, the second direction being orthogonal to the first direction; the second coating patterns extend in the second direction, and the entirety of each of the first coating patterns is located within an outer periphery of one of the second coating patterns in the second direction.

18. The display window as claimed in claim 1, wherein: the first coating patterns extend in a second direction, the second direction being orthogonal to the first direction; the second coating patterns extend in the second direction, and the entirety of each of the first coating patterns is located within an outer periphery of one of the second coating patterns in the second direction.

* * * * *